US011121790B2

(12) United States Patent
Hunter et al.

(10) Patent No.: US 11,121,790 B2
(45) Date of Patent: Sep. 14, 2021

(54) LATENCY REDUCTION IN ETHERNET FRAMES

(71) Applicant: Arista Networks, Inc., Santa Clara, CA (US)

(72) Inventors: Callum Hunter, Sydney (AU); Thomas Dejanovic, Canterbury (AU)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 16/666,126

(22) Filed: Oct. 28, 2019

(65) Prior Publication Data

US 2021/0058178 A1    Feb. 25, 2021

Related U.S. Application Data

(60) Provisional application No. 62/889,983, filed on Aug. 21, 2019.

(51) Int. Cl.
*H04J 3/06*        (2006.01)

(52) U.S. Cl.
CPC ............ *H04J 3/067* (2013.01); *H04J 3/0682* (2013.01)

(58) Field of Classification Search
CPC ...... H04J 3/0667; H04J 3/0697; H04J 3/0658; H04J 3/0638; H04J 3/0641; H04J 3/067; H04J 3/0682; H04J 3/0664; H04W 56/00; H04W 56/001
See application file for complete search history.

(56) References Cited

U.S. PATENT DOCUMENTS

| | | | | |
|---|---|---|---|---|
| 2002/0114357 A1* | 8/2002 | Samrao | ................. | H04J 3/0623 370/516 |
| 2002/0126685 A1* | 9/2002 | Leatherbury | ...... | H04N 21/6168 370/432 |
| 2003/0048506 A1* | 3/2003 | Handelman | ............. | H04J 14/08 398/48 |
| 2003/0118054 A1* | 6/2003 | Zhu | ......................... | H04L 45/00 370/474 |
| 2004/0234000 A1* | 11/2004 | Page | ..................... | H04L 7/0008 375/259 |
| 2012/0315039 A1* | 12/2012 | Toyozumi | .......... | H04Q 11/0005 398/53 |
| 2013/0322462 A1* | 12/2013 | Poulsen | .................... | H04J 3/06 370/458 |

* cited by examiner

*Primary Examiner* — Atique Ahmed
(74) *Attorney, Agent, or Firm* — Fountainhead Law Group P.C.

(57) ABSTRACT

A bitstream representing an Ethernet frame is received over a physical medium. Encoded Ethernet blocks are recovered from the bitstream. The Ethernet blocks are descrambled and provided to downstream switching logic, intact, without removing the synchronization bits that were added during the encoding process. More particularly, the intact descrambled Ethernet block is divided into smaller-sized data words; the size of the data words being an integer multiple of the size of the Ethernet block.

22 Claims, 8 Drawing Sheets

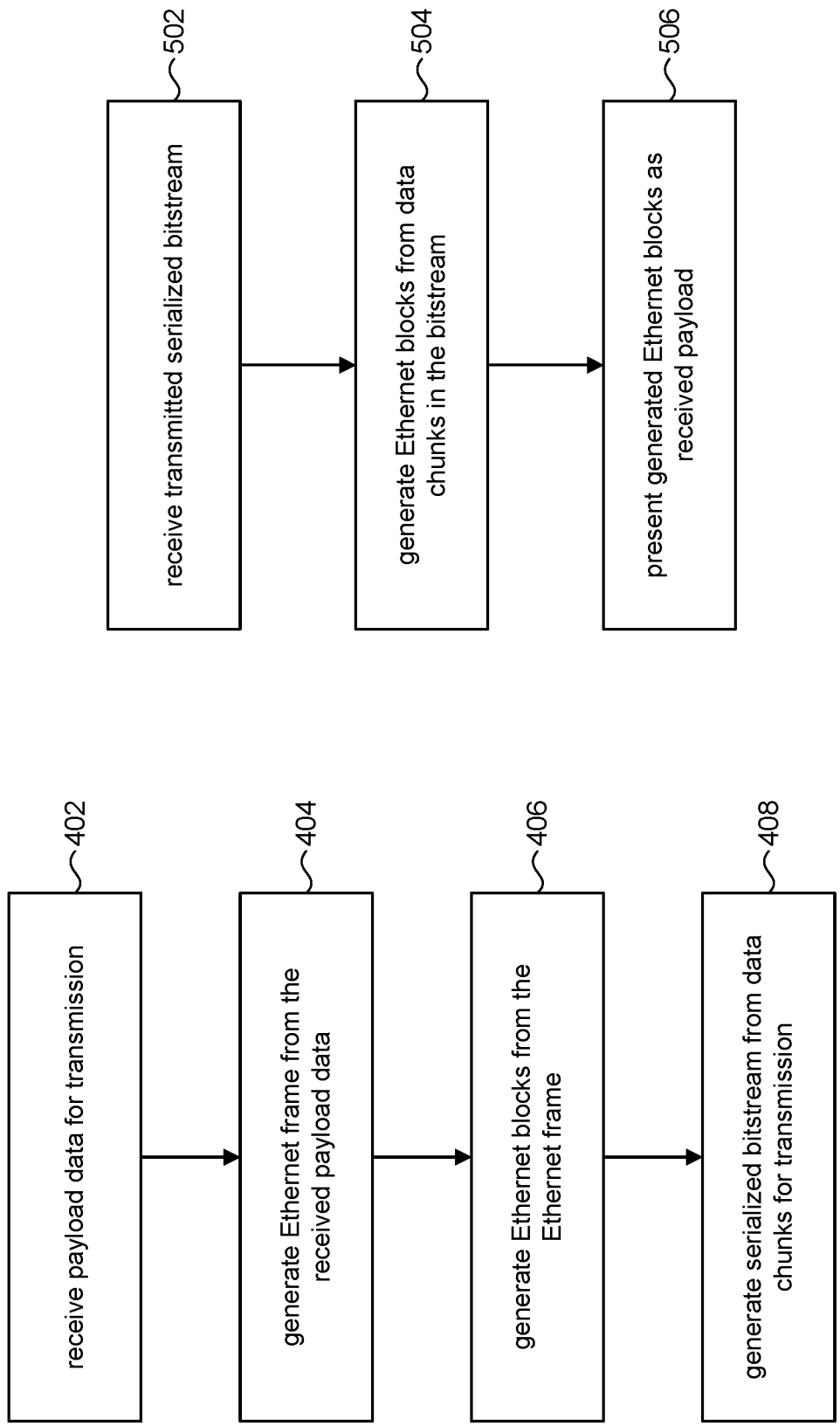

LATENCY REDUCTION IN ETHERNET FRAMES

CROSS REFERENCE TO RELATED APPLICATIONS

Pursuant to 35 U.S.C. § 119(e), this application is entitled to and claims the benefit of the filing date of U.S. Provisional App. No. 62/889,983 filed Aug. 21, 2019, the content of which is incorporated herein by reference in its entirety for all purposes.

BACKGROUND

The 10 Gb Ethernet stream at its lowest level is made up of 66-bit blocks that contain 64 data bits and 2 synchronization header bits. A typical design aligns (gearbox) to the synchronization bits, extracts the 64 bits of data and transports this in a 32-bit data-path (or some $2^N$ ratio) at a nominal frequency of approximately 312.5 MHz. This is convenient from a processing point of view because once aligned, the 32 bit data-path can be easily recovered because required data is found in fixed bit locations. However, some customers are increasingly requesting lower and lower latency designs from their Ethernet products and applications in order to react as quickly as possible to changing conditions.

An example of such customers are high frequency stock traders. High frequency trading platforms use powerful computers to transact orders in fractions of a second. The computers use complex algorithms to analyze multiple markets and execute orders based on market conditions. These platforms can perform best when they have the most up-to-date market information, which can be achieved by reducing latency wherever data must be recovered within the network, namely at the Ethernet ports of network devices.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 4 shows operations for transmitting an Ethernet frame on a physical medium.

FIG. 5 shows operations for recovering an Ethernet frame transmitted on a physical medium.

DETAILED DESCRIPTION

Figure 1:
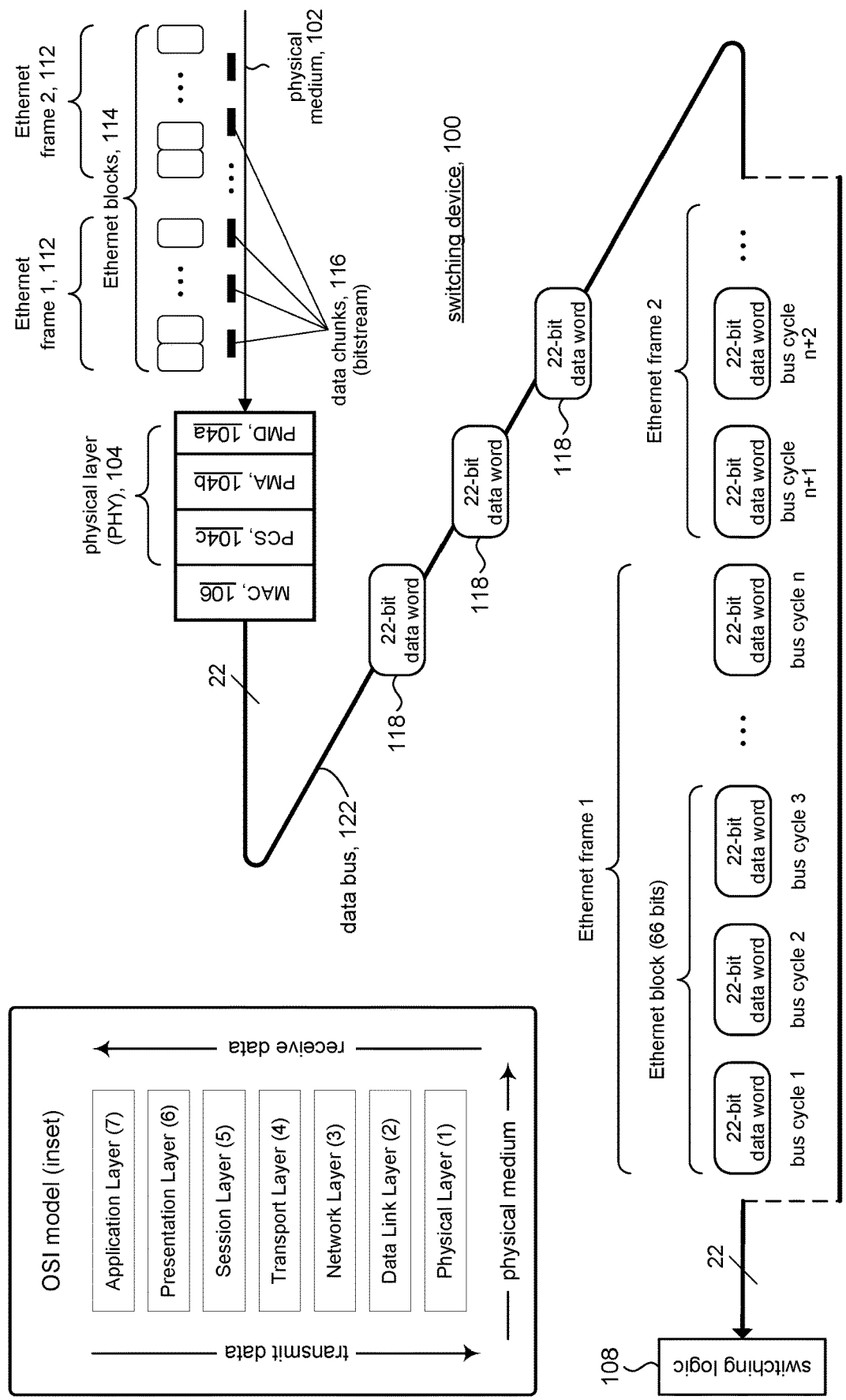
FIG. 1 illustrates a system block diagram in accordance with some embodiments of the present disclosure.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Conventional processing of an Ethernet block includes stripping the sync bits from the 66-bit Ethernet block, extracting the 64 bits of payload data, and transporting the payload data on a 32-bit (or some $2^N$) data path. The combinatorial logic required to perform all this adds to latency. Systems such as high frequency stock trading platforms are demanding lower and lower latencies from their data connections (e.g., switching devices), in some cases requiring every possible nanosecond to be shaved off of the latency. This can be accomplished by increasing the data path and/or increasing the clock frequency.

Increasing the data path width requires large combinatorial logic blocks for functions such as receive/transmit barrel-shifters (e.g. 32 33:1 multiplexers), descramblers & scramblers, FCS checking & generation, and so on. In addition, wide data paths strain routing and associated resources. The additional logic, however, imposes timing constraints, requiring tight timing tolerances so that all the additional logic can function together. Large routing paths may actually increase delay because existing design tools take advantage of clock phase shift across a chip.

Increasing the clock frequency works in opposition to increasing data path width because higher clock rates exacerbate the difficulties in maintaining proper timing between the logic blocks. Further, higher clock frequencies are difficult to match with good working transceiver configurations (especially in FPGA hard IP cores). Higher clock frequencies may also require additional clock domain crossings which can incur latency thus mitigating the benefits of increasing the clock frequency.

By comparison, processing an Ethernet block in accordance with the present disclosure, leaves the Ethernet block (i.e., the sync bits are not removed) intact and provides the Ethernet block to the MAC across a data path that is 66/n bits wide, where n is an integer multiple of the size of the Ethernet block; e.g., 1, 2, 3, 6, 11, 22, 33, or 66. Since the sync bits are retained, there are reduced resource requirements associated with realigning the payload. In some embodiments, for example, the data bus can be 22 bits wide, which calls for an increased clock frequency. However, the combinatorial logic and routing/resource requirements for a 22-bit data bus is reduced, thus lessening the impact of the timing constraints between logic blocks. For example, the barrel shifter for conventional processing of an Ethernet block comprises 32 33:1 multiplexers (rotate and strip the sync bits); whereas the barrel shifter to process an Ethernet block in accordance with the present disclosure only uses 22 22:1 multiplexers (rotation only). Further in accordance with the present disclosure, the entire Ethernet frame can be provided to downstream switching logic.

In order to facilitate processing by the downstream switching logic of an Ethernet frame and its constituent Ethernet blocks, where the sync bits are retained, control signals can be generated. As explained in more detail below, an HDR_VLD control signal can be generated and provided to the downstream switching logic to mark or otherwise identify the location of the sync bits and hence the start of an Ethernet block. A start of frame (SOF) control signal can be generated based on the start of an Ethernet frame so the downstream switching logic can know the beginning of an Ethernet frame. An end of frame (EOF) control signal can mark the last data word of the last Ethernet block in the Ethernet frame, signaling the end of the Ethernet frame. An additional ERL control signal can mark the first data word of the last Ethernet block in the Ethernet frame.

By delivering the Ethernet blocks in data words that are integral multiples of the Ethernet block size and preserving the sync bits, the delay incurred in realigning the Ethernet blocks on byte boundaries can be avoided. Likewise, by delivering the entire Ethernet frame to the switching logic, delays incurred in unpacking the Ethernet frame to access the encapsulated Ethernet packet can be avoided. Customized downstream logic can identify the actual Ethernet frame using the control signals. The tradeoff between reduced delay and providing customized logic may be justified in applications where reducing delay time is an important factor.

FIG. 1 is a high level demonstration of operation of the physical layer 104 (sometimes abbreviated PHY) in switching device 100 in accordance with the present disclosure. The physical layer 104 is the lowest layer of the Open Systems Interconnection (OSI) reference model (see inset in FIG. 1). The OSI model provides a standard for computer systems to communicate with each other. It is generally understood that the OSI model serves as a reference only. The functions of the physical layer 104 are not necessarily implemented in well-defined sub-layers such as shown in the OSI model. However, for discussion purposes and without loss of generality it will be useful to describe embodiments disclosed herein in terms of the distinct layers shown in the OSI model with the understanding that the functions in a given implementation may not be clearly delineated as in the OSI model.

The physical layer 104 is responsible for the actual physical connection and transmission of data between devices; e.g., between switching device 100 and a host computer (not shown). A physical medium (signal transmission medium) 102 connects the two devices for signal transmission. The physical medium 102 carries information in the form of a serial stream of bits (bitstream), and in various embodiments can be a copper wire based medium (e.g., Ethernet cable), an optical fiber, and so on. The physical layer 104 receives data from and transmits data to the physical medium 102.

Per the OSI model, the physical layer 104 typically includes a physical medium dependent (PMD) sublayer 104a, which operates as a transceiver to receive electrical signals within the switching device 100 and generate signals (e.g., light pulses, electron flow, etc.) for transmission on the physical medium 102, and vice versa to receive signals on the physical medium and generate electrical signals for use by the switching device. A physical medium attachment (PMA) sublayer 104b typically identifies bits in the bitstream, recovers a clock signal from the bitstream, and provides serialization/deserialization functionality to convert between serial and parallel data. The physical coding sublayer (PCS) 104c typically includes scrambling/descrambling and line encoding/decoding of data blocks.

The OSI model defines a data link layer, which facilitates data transfer between two devices. The data link layer in switching device 100 includes the media access control (MAC) layer 106. The remaining functionality in switching device 100 can be collectively represented by switching logic 108.

The switching device 100 can receive Ethernet frames 112 on the physical medium 102. An Ethernet frame 112 can be broken/decomposed into units called Ethernet blocks 114, and Ethernet blocks can be decomposed into the data chunks 116 that are transmitted on the physical medium 102 in the form of a bitstream. In accordance with the present disclosure, the physical layer 104 receives data chunks 116 on the physical medium and generates corresponding data words 118 (Ethernet words). In accordance with the present disclosure, the data words 118 have a data size that is a multiple integer of the Ethernet blocks 114 that they represent. FIG. 1 illustrates a specific example, where the Ethernet blocks 114 are 66 bits and each Ethernet block is represented by three 22-bit data words 118. It will be appreciated that in other embodiments, the data words 118 can have sizes that are related to the size of the Ethernet block 114 by integer factors. In some embodiments, for example where the Ethernet block size is 66 bits, the data word (bus) width can be 66/n bits, where n can be 1, 2, 3, or 6. In other embodiments, the data word (bus) width can be 66×m, where m is an integer and m≥1. For convenience, 66-bit Ethernet blocks and 22-bit data words (n=3) will be used to describe various embodiments of the present disclosure without loss of generality.

The data words 118 can be provided in parallel to the switching logic 108 on a 22-bit data bus 122 that connects the MAC layer 106 to the switching logic. Data words 118 can be provided to the switching logic 108, one data word per bus cycle.

Figure 2:
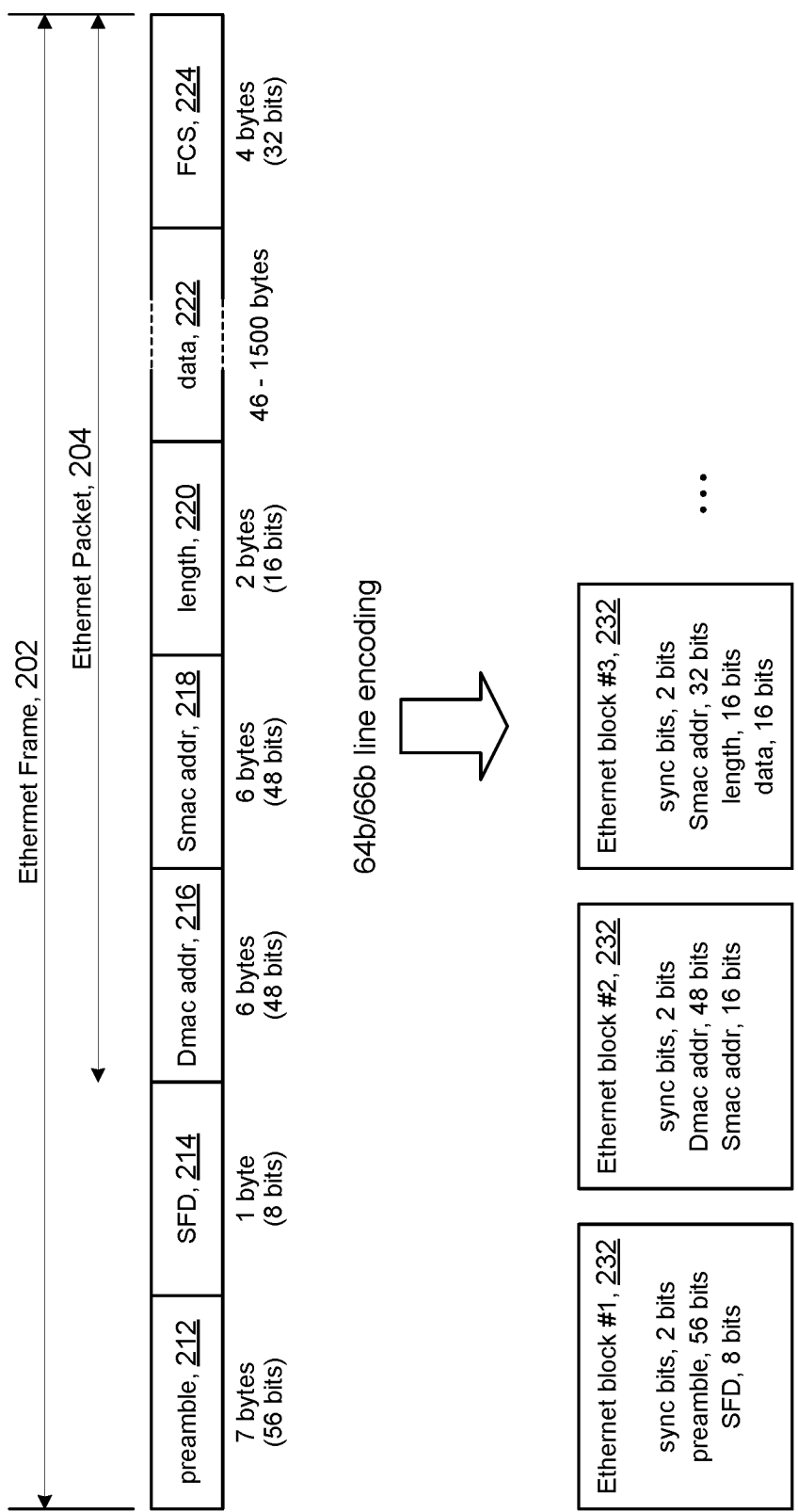
FIG. 2 shows the elements in an Ethernet frame.

FIG. 2 illustrates an example of an Ethernet frame 202 in the context of processing by the physical layer 104 in accordance with the present disclosure. Ethernet frame 202 can encapsulate an Ethernet packet 204. The figure shows data bits in fields 216-224 that define Ethernet packet 204 and data bits in fields 212 and 214 that encapsulate the Ethernet packet into Ethernet frame 202. The data bits of Ethernet frame 202 include preamble data field 212 and start frame delimiter (SFD) data field 214, in addition to Ethernet packet 204. The data fields of Ethernet packet 204, in turn, includes a destination MAC address 216, a source MAC address 218, the length 220 of the following data, the actual data 222, and a frame check sequence 224. The figure also shows the size of each field. The data field 222 can vary in size and may contain padding bytes.

As mentioned in connection with FIG. 1, an Ethernet frame can be divided into units called Ethernet blocks. Each Ethernet block is generated using line encoding, which serves to facilitate recovering the clock and alignment of the bitstream at the receiver. A common line code is the 64b/66b line code, where every 64 bits of payload data (in this case the Ethernet frame) is coded as a 66-bit block, namely the Ethernet block. The two bits added to the 64-bit payload data are sometimes referred to as synchronization (sync) bits. It will be appreciated that other line code schemes can be used, resulting in different sized Ethernet blocks.

FIG. 2 shows the encoding of an Ethernet frame 202 into Ethernet blocks 232. In some embodiments, 64b/66b line encoding is applied to the Ethernet frame 202 as part of the process of transmitting the Ethernet frame. The encoding takes every 8 bytes (64 data bits) from the Ethernet frame and adds two synchronization (sync) bits to the beginning of the 8 byte data to generate a 66-bit Ethernet block 232. For example, Ethernet block #1 contains, in addition to the sync bits, the first 8 bytes (data bits) of the Ethernet frame 202, namely the 7-byte preamble and the 1-byte SFD. Ethernet block #2 contains, in addition to the sync bits, the next 8 bytes (data bits) of the Ethernet frame, namely, the 6 bytes of the destination MAC address and the first two bytes of the 6-byte source MAC address. Ethernet block #3 contains the last four bytes of the source MAC address, the 2-byte length field 220, and the first two bytes from the data field 222, and so on. Additional processing is performed (discussed below) to generate the bitstream that is ultimately transmitted on the physical medium.

Figure 3:
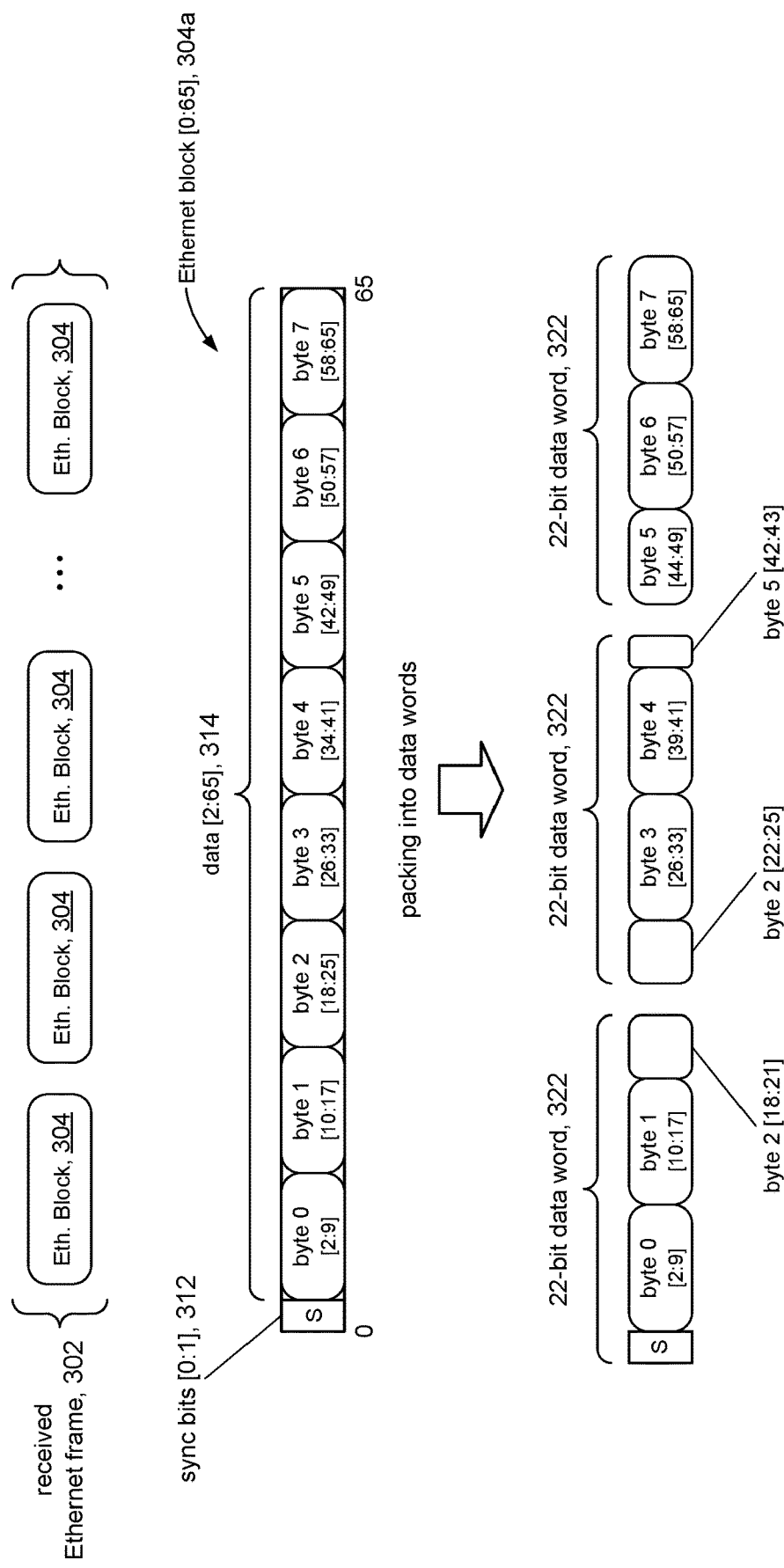
FIG. 3 illustrates packing of Ethernet blocks in accordance with the present disclosure.

FIG. 3 shows an aspect of processing a bitstream when it is received on the physical medium. The received bitstream represents an Ethernet frame 302. The received bitstream is processed to recover the 66-bit Ethernet blocks 304 that comprise the Ethernet frame 302. In accordance with the present disclosure, each Ethernet block 304 can be processed to produce one or more corresponding data words 322 having a size that is an integral multiple of the Ethernet block 304. Detail is shown for a representative Ethernet block 304a, showing the two sync bits 312 in bit positions 0 and 1 of the Ethernet block and the 64-bit payload data 314 is represented as 8 data bytes that occupy bit positions 2-65 of the Ethernet block. In accordance with the present disclosure, each 66-bit Ethernet block 304 that is generated from the bitstream is packed evenly into three 22-bit data words, where each bit position in the Ethernet block corresponds to a bit position in one of the corresponding data words, and vice versa each bit position in a corresponding data word corresponds to a bit position in the Ethernet block. FIG. 3 illustrates an example of the packing of Ethernet block 304a into data words 322. In accordance with the present disclosure, an Ethernet block is descrambled but not decoded before being packed into data words; in other words, the sync bits 312 are packed along with the payload data 314 into the data words. This aspect of the present disclosure is discussed further below.

Referring to FIG. 4, the discussion will now turn to a high level description of processing in a switching device (e.g., 100, FIG. 1) for transmitting data. In some embodiments, for example, the switching device can comprise digital logic (e.g., FPGA, ASIC, etc.) configured to perform processing in accordance with FIG. 4. In other embodiments, the switching device can include a combination of digital logic and program code that cooperate to cause the switching device to perform processing in accordance with FIG. 4. For convenience, operations in the switching device will be explained in terms of the data link layer and physical link layer of the OSI reference model.

At operation 402, the switching device can receive payload data for transmission on a physical medium. In some embodiments, for example, the payload data can be from a higher layer in the OSI model; e.g., a TCP/IP packet from Layer 4.

At operation 404, the switching device can generate an Ethernet frame that encapsulates the received payload data. This operation corresponds to the functionality provided in the data link layer. The format of an Ethernet frame is shown in FIG. 2, where the payload data received at operation 402 constitutes the data portion 222. The data link layer, and in particular the MAC sublayer, can add the other remaining data fields such as the destination and source MAC addresses 216, 218, a preamble 212, an error detection code (FCS) 224, and other fields to generate an Ethernet frame.

At operation 406, the switching device can partition each Ethernet frame to generate a group of Ethernet blocks. This operation corresponds to functionality provided in the physical coding sublayer (PCS) of the physical link layer. The PCS can include shift registers, multiplexers, and other suitable logic that break the Ethernet frame into 64-bit blocks. A scrambler function can then be applied to scramble each 64-bit block. Two synchronization bits are prepended to each scrambled 64-bit block to produce a 66-bit Ethernet block. In some embodiments, the PCS can further break up the 66-bit Ethernet block into smaller data chunks (e.g., 116, FIG. 1), which are then separately transmitted on the physical medium. In some embodiments, for example, commercially available IP cores can be configured to process chunks of data of various sizes; e.g., 20-bit data chunks, 22-bit data chunks, or 32-bit data chunks, etc. Logic can be provided to break up the 66-bit Ethernet block into suitably sized data chunks for the IP core according to the core is configured. In other embodiments, the PCS can transmit the entire 66-bit Ethernet block as a single data chunk.

At operation 408, the switching device can generate a bitstream from the received data chunks. This operation corresponds to the functionality provided in physical media attachment (PMA) sublayer of the physical link layer. The PMA, for example, can serialize the received data chunks, which arrive as parallel data (e.g., 20/22/32-bit parallel data), for transmission on the physical medium as a serial bitstream.

Referring to FIG. 5, the discussion will now turn to a high level description of processing in a switching device (e.g., 100, FIG. 1) for processing received data in accordance with the present disclosure. In some embodiments, for example, the switching device can comprise digital logic (e.g., FPGA, ASIC, etc.) configured to perform processing in accordance with FIG. 5. In other embodiments, the switching device can include a combination of digital logic and program code that cooperate to cause the switching device to perform processing in accordance with FIG. 5. For convenience, operations in the switching device will be explained in terms of the data link layer and physical link layer of the OSI reference model.

At operation 502, the switching device can receive a serial bitstream on the physical medium. The bitstream can be the serialized data chunks transmitted at operation 408 in FIG. 4, which collectively represent an Ethernet frame (data packet). This operation corresponds to the functionality typically associated with the PMA sublayer of the physical link layer. In some embodiments, for example, the PMA can convert the serialized data chunks to generate data chunks as parallel data.

At operation 504, the switching device can generate Ethernet blocks comprising the Ethernet frame (FIG. 3) from the data chunks. This operation corresponds to the functionality typically associated with the PCS sublayer of the physical link layer. In some embodiments, for example, the PCS can combine one or more data chunks received from the PMA to generate 66-bit blocks and align the 66-bit blocks to the sync bits (lock onto the sync bits) to recover the 66-bit Ethernet block. The PCS can descramble the 64-bit payload portion of the Ethernet block to recover the original descrambled payload. In accordance with the present disclosure, the two sync bits are retained. The resulting 66-bit Ethernet block with the descrambled 64-bit payload can be referred to as the "descrambled" Ethernet block.

At operation 506, the PCS in the switching device can present or otherwise provide the descrambled 66-bit Ethernet blocks that comprise the received Ethernet frame to the MAC sublayer of the data link layer in the OSI model, which in turn can pass the Ethernet blocks on to the remaining switching logic. In accordance with the present disclosure, the PCS can retain the 66-bit structure of the Ethernet block and pack the 66 bits into an integral number of data words, without removing the two sync bits. As shown in FIG. 3, in some embodiments, for example, the 66 bits comprising the Ethernet block can be packed into three 22-bit data words, which can then be presented to the MAC for further processing. In other embodiments, the 66-bit Ethernet block can be packed into six 11-bit data words or two 33-bit data words. In still other embodiments, the data word can be the entire 66-bit Ethernet block, which may be suitable for high speed switching operation (e.g., 25 GbE, 40 GbE, etc.).

Figure 6A:
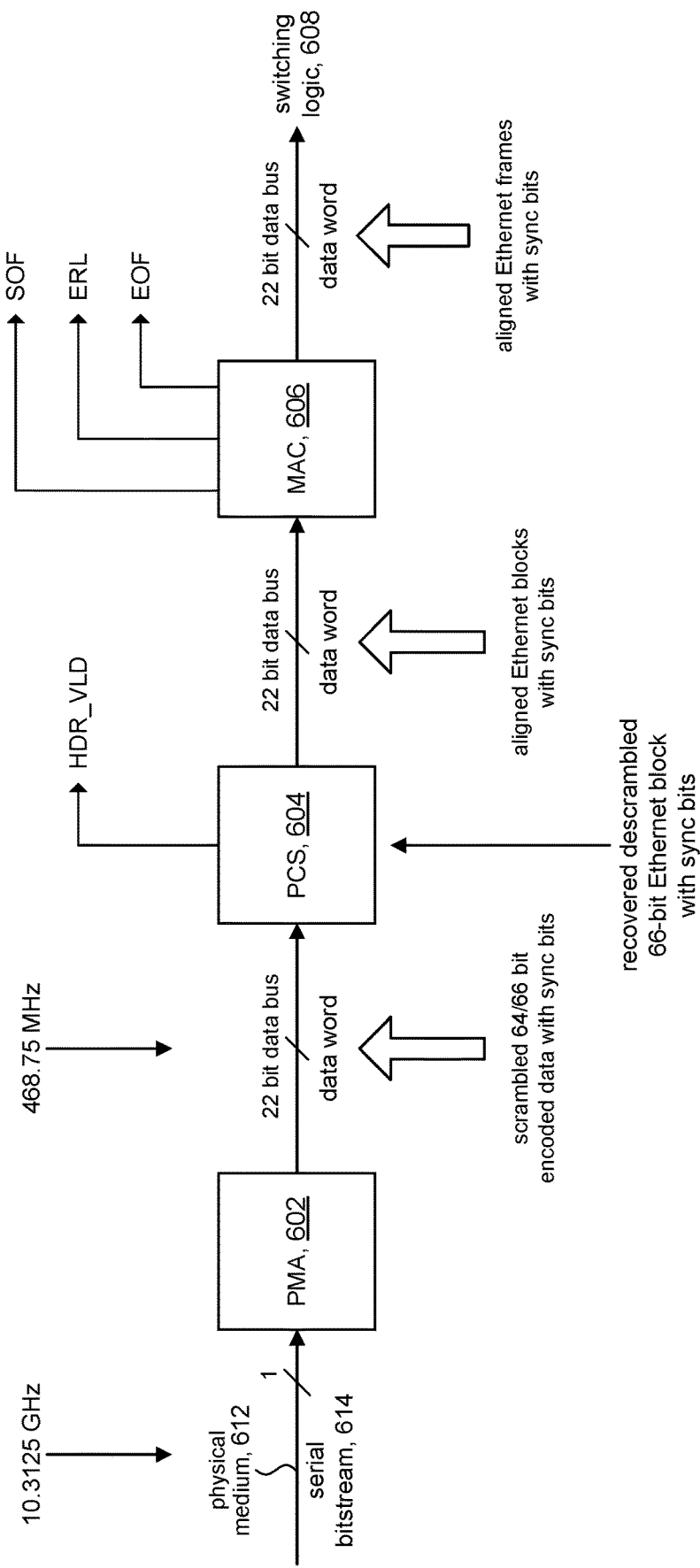
FIGS. 6A and 6B show an illustrative embodiment in accordance with the present disclosure.

FIG. 6A shows an illustrative embodiment of a physical link layer component (e.g., 104, FIG. 1) in a switching device in accordance with the present disclosure. A PMA sublayer 602 can be configured to receive a serial bitstream 614 on physical medium 612. As explained above, the bitstream 614 represents transmitted data chunks that constitute the 66-bit Ethernet blocks of an Ethernet frame. In some embodiments, for example, the PMA 602 can include deserializer logic to convert the serial bitstream to generate the data chunks as parallel data and output them onto a 22-bit parallel data bus as 22-bit data words. The data bus can be operated at a clock frequency that depends on the line rate of the bitstream 614. The line rate in a 10 Gb Ethernet (10 GbE), for example, is 10.3125 GHz nominal; the bits come in at 10.3125 GHz. Accordingly, the data bus can be operated at 468.75 MHz (10.3125 GHz÷22) nominal; that is, the 22-bit data bus can be clocked by a bus clock (not shown) running at 468.75 MHz. The generated data words are clocked onto the data bus and provided to PCS sublayer 604 at 468.75 MHz.

The PCS sublayer 604 can include logic (e.g., a gearbox) to combine the 22-bit data words received from PMA 602 to generate a 66-bit block of data that is aligned to the sync bits (i.e., locked onto the sync bits) to recover a 66-bit Ethernet block. PCS 604 can include descrambler logic to descramble the 64-bit portion of the recovered Ethernet block that constitutes the payload. It will be appreciated, however, that in other embodiments, the descrambler logic can be provided in PMA 602.

In accordance with the present disclosure, the PCS 604 can retain the two sync bits, instead of stripping them off. PCS 604 can pass the 66-bit descrambled and aligned Ethernet block to the downstream logic in units of 22-bit data words on a 22-bit data bus, thus obviating the need for additional combinatorial logic to realign the 64-bit payload onto a 32-bit, or other $2^N$-sized, data bus. In some embodiments, the PCS 604 can include digital logic to generate a control signal (HDR_VLD) that can be used by the downstream logic (e.g., MAC 606, switching logic 608). The HDR_VLD control signal can mark or otherwise identify the location of the sync bits and hence the start of an Ethernet block.

The MAC 606 can receive the 22-bit data words from PCS 604 and pass them on to the next higher layer in the OSI model as aligned Ethernet frames, without removing the sync bits from the Ethernet blocks that constitute the Ethernet frames. An Ethernet frame is aligned in that the first 22-bit data word of each Ethernet block in the Ethernet frame has the sync bits at the start of that first 22-bit data word (see FIG. 6B). In accordance with some embodiments of the present disclosure, MAC 606 can pass the Ethernet frames to the next higher layer in units of 22-bit data words, rather than removing the sync bits and realigning the data words. Further in accordance with the present disclosure, each Ethernet frame is passed in its entirety on to the switching logic 608 in units of Ethernet blocks. In some embodiments, the MAC 606 can include digital logic to provide various control signals that the downstream logic can use to process an Ethernet frame. A start of frame (SOF) control signal can be generated based on the start of the Ethernet frame (e.g., the first sync bit in the first data word of the first Ethernet block comprising the Ethernet frame) so the downstream logic can know the beginning of an Ethernet frame. Other control signals can include an end of frame (EOF) control signal that can mark the last data word of the last Ethernet block in the Ethernet frame, signaling the end of the Ethernet frame. In some embodiments, an additional ERL control signal can mark the first data word of the last Ethernet block in the Ethernet frame.

Figure 6B:
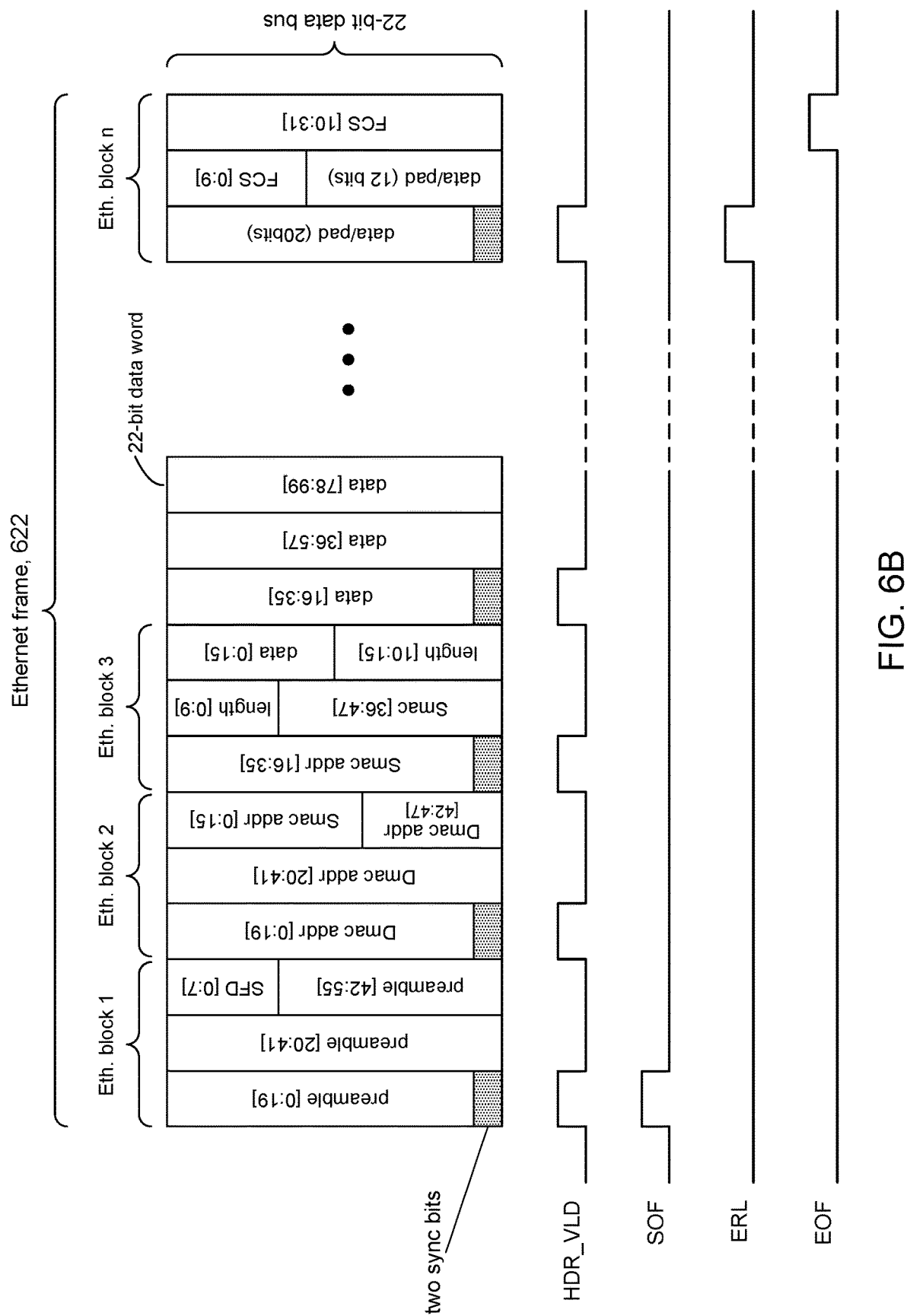

FIG. 6B depicts an illustrative example of the control signals shown in FIG. 6A. The figure shows the packing of the data fields of an Ethernet frame 622 into 22-bit data words as they may appear on a 22-bit data bus. The figure highlights the partitioning of the Ethernet frame 622 into Ethernet blocks. Each Ethernet block is further partitioned into three 22-bit data words. FIG. 6B further highlights the partitioning and alignment of the various data fields comprising the Ethernet frame 622 in each 22-bit data word.

By delivering the Ethernet blocks in data words that are integral multiples of the Ethernet block size and preserving the sync bits, delays incurred in realigning the Ethernet blocks on byte boundaries can be avoided. Likewise, by delivering the entire Ethernet frame to the switching logic, delays incurred in unpacking the Ethernet frame to access the encapsulated Ethernet packet can be avoided. Customized downstream logic can identify the actual Ethernet frame using the control signals. Consider, for example, switching logic 608. In some embodiments, switching logic 608 can perform source MAC learning, which involves identifying the source MAC address in the stream of Ethernet blocks received from MAC 606. The SOF control signal can inform the switching logic 608 that a received Ethernet block represents the first block in an Ethernet frame. The ERL and EOL control signals can inform the switching logic 608 that a received Ethernet block represents the last block in an Ethernet frame. The HDR_VLD control signal can inform the switching logic 608 that it is receiving an Ethernet block. Since the information (e.g., source MAC address, etc.) can be in fixed locations among the Ethernet blocks (as depicted in FIG. 6B, for instance), the switching logic 608 can use the HDR_VLD control signal to keep track of the Ethernet blocks and determine when to skip over the sync bits. The information (e.g., source MAC address) can be extracted from the Ethernet blocks on the fly, without requiring the switching logic 608 to reconstruct the Ethernet frame first and then reading out the information. Other information in the Ethernet frame can be extracted in the same way. For example, the destination MAC address can be extracted to determine an egress port, and so on. The tradeoff between having to provide customized logic to perform on-the-fly processing vs. being able to reduce delay (latency) may be justified in use cases where reducing delay time is an important factor.

Figure 7:
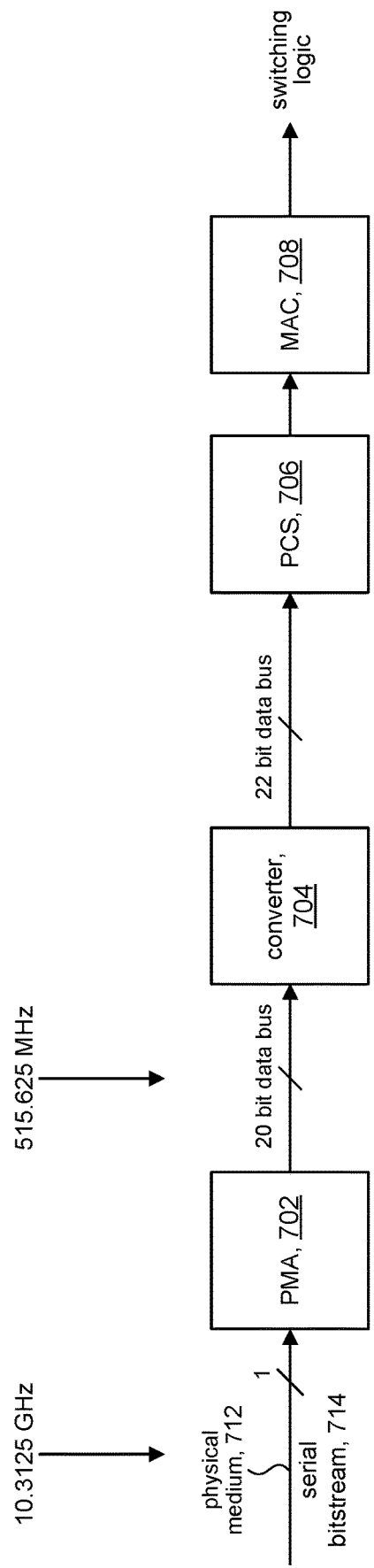
FIG. 7 shows an illustrative embodiment in accordance with the present disclosure.

In some embodiments according to the present disclosure, a PMA may not be configured with a data bus that is an integral multiple of the Ethernet block. Such a use case may arise, for example, due to configuration limitations in the available hardware. FIG. 7 shows a PMA 702 that outputs data on a 20-bit wide data bus. The PMA 702 can be configured to receive a serial bitstream 714 on physical medium 712. As explained above, the bitstream 714 can represents chunks of data that constitute the 66-bit Ethernet blocks of an Ethernet frame. Suppose for discussion purposes the PMA 702 is configured to generate the data chunks as parallel data and output them onto a 20-bit parallel data bus as 20-bit data words. In some embodiments, a converter 704 having a 20-bit input bus and a 22-bit output bus can be disposed at the output the PMA 702 before the PCS 704. The converter 704, for example, can receive 20-bit intermediate data words at its 20-bit input bus, identify the occurrence of the sync bits in the input, align to the sync bits, and output 22-bit intermediate data words on the 22-bit output bus.

The PCS 706 can include logic to combine the 22-bit data words received from the bus converter 704 to generate a 66-bit Ethernet block. PCS 706 can include descrambler logic to descramble the 64-bit portion of the Ethernet block that constitutes the payload. In accordance with the present disclosure, the PCS 706 can retain the two sync bits so that the 66-bit descrambled Ethernet block can be transferred onto a 22-bit data bus as three 22-bit data words, thus obviating the need for combinatorial logic to realign the payload onto a 32-bit or other $2^N$-sized data bus. The MAC 708 can pass the Ethernet blocks received from the PCS 708, intact, on to the next higher layer in the OSI model.

The foregoing illustrative embodiments have been described using a 22-bit data bus as an example. It will be appreciated that other embodiments can use other data bus widths equal to 66/n, where n is an integer multiple of the Ethernet block size; e.g., n=1, 2, 3, 6, 11, 22, 33, 66. The disclosed embodiments use 64b/66b line coding to produce 66-bit Ethernet blocks. It will be appreciated that other line coding schemes can be employed to generate Ethernet blocks of different size, and that the data bus width can be an integral multiple of the size of the Ethernet block. Embodiments in accordance with the present disclosure are not limited to 10 GbE and can be practiced at other speeds such as 5 GbE, 25 GbE. The physical medium can be electrical wire, optical fiber, and includes wireless connections.

Figure 8:
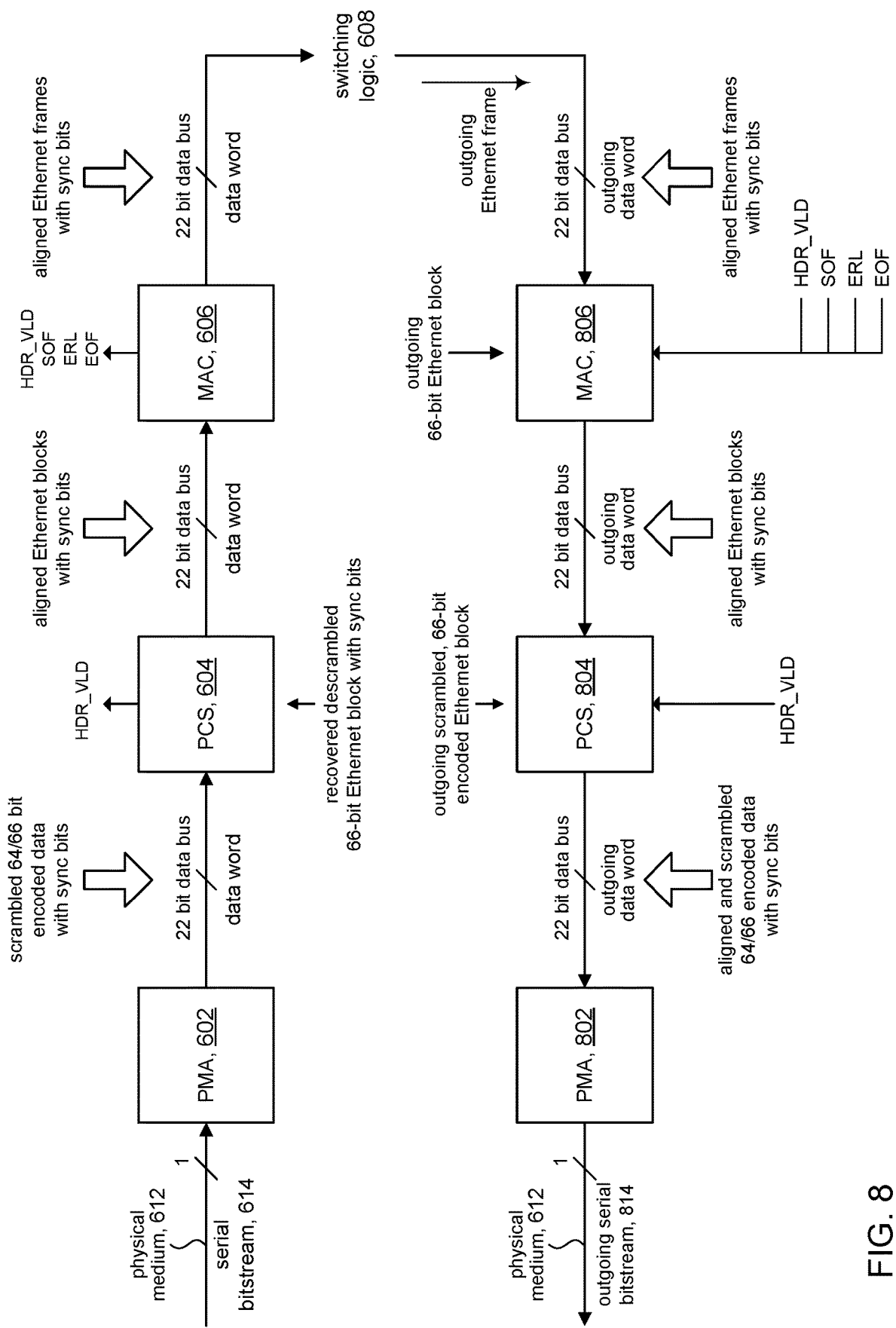
FIG. 8 shows processing on the transmission side in accordance with the present disclosure.

FIG. 8 illustrates transmission in the physical link layer in a switching device in accordance with the present disclosure. In some embodiments, processing in the physical link layer on the transmission side (egress) can be considered a mirror image of the processing that occurs on the receive side. FIG. 8 shows transmission-side processing in conjunction with receive-side processing (e.g., FIG. 6A) in accordance with some embodiments of the present disclosure. The control signals (HDR_VLD, SOF, ERL, EOF) generated by the receiver-side logic can be used on the transmission side to keep synchronized with the stream of Ethernet frames from the switching logic 608.

As explained above, the receive-side MAC 606 can pass Ethernet frames to the switching logic 608 in units of 22-bit data words, where every three data words constitute an Ethernet block with its sync bits retained. In accordance with some embodiments, the switching logic 608 can process a received Ethernet frame and forward the Ethernet frame as an outgoing Ethernet frame, which already includes the sync bits and is aligned to the sync bits, for transmission. In particular, the outgoing Ethernet frame is aligned on the data bus such that the first data word of each Ethernet block has the sync bits at the start.

The transmission-side (egress) MAC 806 can receive the Ethernet frames from the switching logic 608 in units of 22-bit data words and pass the received 22-bit data bit words on to the transmission-side PCS sublayer 804 as-is. Recall that the SOF control signal is used to mark the start of an Ethernet frame. This signal can be used by the egress MAC 806 to figure out if it should generate and inject an idle block or not. When MAC 806 sees a SOF, it passes through the Ethernet frame until it sees the EOF control signal. Once EOF has been passed through, the MAC 806 generates and inserts Ethernet idle blocks until the next SOF is seen.

The egress MAC 806 can use the ERL control signal to determine the start of the Ethernet block that terminates the current Ethernet frame; se FIG. 6B for instance. The ERL control signal tells the MAC 806 to prepare for injection of an Ethernet idle block. This applies to all bus widths up to 33 bits. At 66-bit, 132-bit, and larger bus widths every cycle contains at least one whole Ethernet block, in which case this signal is still used to gate injection of an Ethernet idle block; however, the timing will depend on the bus width.

The PCS sublayer 804 can include logic to combine every three 22-bit data words received from MAC 806 to recover the 66-bit Ethernet block for further processing. For example, the HDR_VLD control signal can be used by the egress PCS 804 to mark the start of each Ethernet block. This applies to all bus widths up to 33 bits. At 66-bit, 132-bit, and larger bus widths every cycle contains at least one whole Ethernet block.

The PCS 804 can include scrambler logic to scramble the 64-bit data payload portion of the recovered 66-bit Ethernet block. The output of PCS 804 constitutes aligned and scrambled 64/66 bit encoded data with sync bits. Since the sync bits are already in the stream, PCS 804 in accordance with the present disclosure does not require logic to insert sync bits into the data. The sync bits are not scrambled, however. Accordingly, the scrambler logic in egress PCS 804 can use the HDR_VLD control signal to know when to skip the two sync bits at the start of the Ethernet block.

In addition, since the Ethernet frames are already aligned to the sync bits, the downstream transmission-side logic (e.g., PCS 804, PMA 802) does not require logic to perform the alignment. The PCS 804 can transmit the aligned and scrambled 66-bit Ethernet block to the transmission-side PMA sublayer 802 in units of 22-bit data words. The PMA 802 can include serializer logic to serialize each 22-bit data word to output an outgoing serial bitstream 814 on the physical medium 612.

FURTHER EXAMPLES

In accordance with the present disclosure a method in a switching device can include receiving a bitstream at an electrical interface of the switching device connected to a signal transmission medium, the bitstream representative of a received data packet. The method further includes generating a plurality of data blocks from the bitstream, each data block comprising synchronization bits from the bitstream and data comprising the received data packet and providing the plurality of data blocks comprising the received data packet to switching logic in the switching device. Providing the plurality of data blocks, includes, for each data block partitioning each data block to generate one or more n-bit data words and outputting a plurality of n-bit data words comprising the plurality of data blocks onto an n-bit data bus connected to the switching logic, wherein n and a size of a data block are related by an integer factor.

In some embodiments, a first n-bit data word among the one or more n-bit data words comprising said each data block contains the synchronization bits in said each data block, the synchronization bits being output to the switching logic.

In some embodiments, every $m^{th}$ data word provided to the switching logic includes one or more of the synchronization bits included in the bitstream, where m and n are related by an integer factor. In some embodiments, the one or more synchronization bits are positioned at the start of every $m^{th}$ data word.

In some embodiments, the method further includes generating a plurality of control signals associated with the n-bit data words, the plurality of control signals including first control signals that identify n-bit data words that contain the synchronization bits, a second control signal that identifies an n-bit data word associated with a beginning of the received data packet, and at least a third control signal that identifies an n-bit data word associated with an end of the received data packet. In some embodiments, the method further includes receiving from the switching logic the received data packet as an outgoing data packet and using the second control signal to identify a beginning of the outgoing data packet. In some embodiments, the method further includes receiving from the switching logic a plurality of outgoing n-bit data words comprising the received data packet as an outgoing data packet and using the first control signal to identify the outgoing data packet as a beginning of an outgoing data block. In some embodiments, the method further includes scrambling the outgoing data block.

In accordance with the present disclosure a switching device can include an electrical interface for connection to a signal transmission medium; first logic circuitry in electrical connection with the electrical interface to receive a bitstream organized as a plurality of data blocks, each data block including synchronization bits and data bits, the first logic circuitry configured to output each data block as a plurality of n-bit data words, wherein one of the n-bit data words includes the synchronization bits, wherein n and a size of a data block are related by an integer factor; second logic circuitry connected to the first logic circuitry to receive the plurality of n-bit data words and configured to perform at least on operation on the plurality of n-bit data words, wherein the synchronization bits in said one of the n-bit data word are not removed; and switching logic connected to the second logic circuitry to receive the plurality of n-bit data words, including the synchronization bits in said one of the n-bit data words.

In some embodiments, every $m^{th}$ data word provided to the switching logic includes one or more of the synchronization bits included in the bitstream, where m and n are related by an integer factor.

In some embodiments, the one or more synchronization bits are positioned at the start of every $m^{th}$ data word.

In some embodiments, the plurality of data blocks constitute an incoming data packet, wherein the second logic circuitry is further configured to output control signals associated with the plurality of n-bit data words, the plurality of control signals including first control signals that identify n-bit data words that contain the synchronization bits, a second control signal that identifies an n-bit data word associated with a beginning of the incoming data packet, and at least a third control signal that identifies an n-bit data word associated with an end of the incoming data packet. In some embodiments, the third control signal identifies a first data word of a last data block comprising the received data packet. In some embodiments, the third control signal identifies a last data word of a last data block comprising the received data packet. In some embodiments, the switching logic is configured to sends the incoming data packet to the second logic circuitry as an outgoing data packet, wherein the second logic circuitry is further configured to use the second control signal to identify a beginning of the outgoing data packet. In some embodiments, the switching logic is configured to sends the incoming data packet to the second logic circuitry as an outgoing data packet, wherein the second logic circuitry is further configured to use the first control signal to identify the outgoing data packets as a beginning of an outgoing data block.

In some embodiments, the second logic circuitry is further configured to scramble the outgoing data block.

In accordance with the present disclosure, a switching device can include means for receiving a bitstream at an electrical interface of the switching device connected to a signal transmission medium, the bitstream representative of a received data packet; means for generating a plurality of data blocks from the bitstream, each data block comprising synchronization bits from the bitstream and data comprising the received data packet; and means for providing the plurality of data blocks comprising the received data packet to switching logic in the switching device. The means for providing the plurality of data blocks can include, for each data block, partitioning each data block to generate one or more n-bit data words and outputting a plurality of n-bit data words comprising the plurality of data blocks onto an n-bit data bus connected to the switching logic, wherein n and a size of a data block are related by an integer factor.

In some embodiments, a first n-bit data word among the one or more n-bit data words comprising said each data block contains the synchronization bits in said each data block, the synchronization bits being output to the switching logic.

In some embodiments, every $m^{th}$ data word provided to the switching logic includes one or more of the synchronization bits included in the bitstream, where m and n are related by an integer factor.

The above description illustrates various embodiments of the present disclosure along with examples of how aspects of the particular embodiments may be implemented. The above examples should not be deemed to be the only embodiments and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a switching device comprising:
   receiving a bitstream at an electrical interface of the switching device connected to a signal transmission medium, the bitstream representative of a received data packet;
   generating a plurality of data blocks from the bitstream, each data block comprising synchronization bits from the bitstream and data comprising the received data packet; and
   providing the plurality of data blocks comprising the received data packet to switching logic in the switching device, including for each data block:
      partitioning each data block to generate one or more n-bit data words; and
      outputting a plurality of n-bit data words comprising the plurality of data blocks onto an n-bit data bus connected to the switching logic, wherein n and a size of a data block are related by an integer factor.

2. The method of claim 1, wherein a first n-bit data word among the one or more n-bit data words comprising said each data block contains the synchronization bits in said each data block, the synchronization bits being output to the switching logic.

3. The method of claim 1, wherein every $m^{th}$ data word provided to the switching logic includes one or more of the synchronization bits included in the bitstream, where m and n are related by an integer factor.

4. The method of claim 3, wherein the one or more synchronization bits are positioned at the start of every $m^{th}$ data word.

5. The method of claim 1, further comprising generating a plurality of control signals associated with the n-bit data words, the plurality of control signals including first control signals that identify n-bit data words that contain the synchronization bits, a second control signal that identifies an n-bit data word associated with a beginning of the received data packet, and at least a third control signal that identifies an n-bit data word associated with an end of the received data packet.

6. The method of claim 5, further comprising receiving from the switching logic the received data packet as an outgoing data packet and using the second control signal to identify a beginning of the outgoing data packet.

7. The method of claim 5, further comprising receiving from the switching logic a plurality outgoing n-bit data words comprising the received data packet as an outgoing data packet and using the first control signal to identify the outgoing data packet as a beginning of an outgoing data block.

8. The method of claim 7, further comprising scrambling the outgoing data block.

9. A switching device comprising:
an electrical interface for connection to a signal transmission medium;
first logic circuitry in electrical connection with the electrical interface to receive a bitstream organized as a plurality of data blocks, each data block including synchronization bits and data bits, the first logic circuitry configured to output each data block as a plurality of n-bit data words, wherein one of the n-bit data words includes the synchronization bits, wherein n and a size of a data block are related by an integer factor;
second logic circuitry connected to the first logic circuitry to receive the plurality of n-bit data words and configured to perform at least on operation on the plurality of n-bit data words, wherein the synchronization bits in said one of the n-bit data word are not removed; and
switching logic connected to the second logic circuitry to receive the plurality of n-bit data words, including the synchronization bits in said one of the n-bit data words.

10. The switching device of claim 9, wherein every $m^{th}$ data word provided to the switching logic includes one or more of the synchronization bits included in the bitstream, where m and n are related by an integer factor.

11. The switching device of claim 10, wherein the one or more synchronization bits are positioned at the start of every $m^{th}$ data word.

12. The switching device of claim 9, wherein the plurality of data blocks constitute an incoming data packet, wherein the second logic circuitry is further configured to output control signals associated with the plurality of n-bit data words, the plurality of control signals including first control signals that identify n-bit data words that contain the synchronization bits, a second control signal that identifies an n-bit data word associated with a beginning of the incoming data packet, and at least a third control signal that identifies an n-bit data word associated with an end of the incoming data packet.

13. The switching device of claim 12, wherein the third control signal identifies a first data word of a last data block comprising the received data packet.

14. The switching device of claim 12, wherein the third control signal identifies a last data word of a last data block comprising the received data packet.

15. The switching device of claim 12, wherein the switching logic is configured to send the incoming data packet to the second logic circuitry as an outgoing data packet, wherein the second logic circuitry is further configured to use the second control signal to identify a beginning of the outgoing data packet.

16. The switching device of claim 12, wherein the switching logic is configured to send the incoming data packet to the second logic circuitry as an outgoing data packet, wherein the second logic circuitry is further configured to use the first control signal to identify the outgoing data packets as a beginning of an outgoing data block.

17. The switching device of claim 16, wherein the second logic circuitry is further configured to scramble the outgoing data block.

18. A switching device comprising:
means for receiving a bitstream at an electrical interface of the switching device connected to a signal transmission medium, the bitstream representative of a received Ethernet frame;
means for generating a plurality of Ethernet blocks from the bitstream, each Ethernet block comprising synchronization bits from the bitstream and data comprising the received Ethernet frame; and
means for providing the plurality of Ethernet blocks comprising the received Ethernet frame to switching logic in the switching device, including for each Ethernet block:
partitioning each Ethernet block to generate one or more n-bit data words; and
outputting a plurality of n-bit Ethernet words comprising the plurality of Ethernet blocks onto an n-bit data bus connected to the switching logic, wherein n and a size of a Ethernet block are related by an integer factor.

19. The device of claim 18, wherein a first n-bit Ethernet word among the one or more n-bit Ethernet words comprising said each Ethernet block contains the synchronization bits in said each Ethernet block, the synchronization bits being output to the switching logic.

20. The device of claim 18, wherein every $m^{th}$ Ethernet word provided to the switching logic includes one or more of the synchronization bits included in the bitstream, where m and n are related by an integer factor.

21. The method of claim 1, wherein the bitstream comprises Ethernet frames.

22. The switching device of claim 9, wherein the bitstream comprises Ethernet frames.

* * * * *